United States Patent [19]

Irvine

[11] 4,191,737

[45] Mar. 4, 1980

[54] INCREASING ALUMINA SLURRY LIFE

[75] Inventor: John L. Irvine, Ponca City, Okla.

[73] Assignee: Conoco, Inc., Ponca City, Okla.

[21] Appl. No.: 948,124

[22] Filed: Oct. 2, 1978

[51] Int. Cl.$^2$ .............................................. C01F 7/00
[52] U.S. Cl. .................................. 423/630; 423/265; 423/625
[58] Field of Search ....................... 423/625, 630, 265; 23/293 R

[56]      References Cited
    U.S. PATENT DOCUMENTS

| 3,653,937 | 4/1972 | Koenig ................................. 423/625 |
| 4,117,105 | 9/1978 | Hertzenberg et al. ................ 423/625 |

FOREIGN PATENT DOCUMENTS 904411  8/1962  United Kingdom ..................... 423/630

*Primary Examiner*—Herbert T. Carter
*Attorney, Agent, or Firm*—Cortlan R. Schupbach, Jr.

[57]          ABSTRACT

Alumina slurries (suspensions) can be stabilized against viscosity increases by treating with water which has been heated to temperatures of from about 40° C. to about 100° C., then cooling, decanting the water, and recovering a wet cake. Water is then added to the recovered wet cake alumina to obtain a slurry with a desired alumina content and $CO_2$ is sparged through the finished slurry. Optionally, hot water saturated with carbon dioxide can be used for the treatment, to extend the stability of the slurry. Peptizing agents can be used as usual.

3 Claims, 2 Drawing Figures

INCREASING ALUMINA SLURRY LIFE

The invention relates to a method for stabilizing alumina slurries against viscosity increases. More particularly, this invention relates to a method for increasing the life of alumina slurries by pre-treating the alumina with hot water. Alumina slurry life can be extended even further by sparging the slurries with carbon dioxide or using carbon dioxide saturated water for the heat treating.

The use of carbon dioxide in some processes is known, such as that described in U.S. Pat. No. 3,245,919, which teaches use of carbon dioxide in conjunction with other materials in catalyst formation. German Offenlegungsschrift No. 2,436,708 teaches the use of carbon dioxide and solutions containing carbon dioxide to stabilize such solutions. U.S. Pat. No. 2,790,725 teaches carbon dioxide with raw mill slurries in the manufacture of portland cement. However, none of these references deal with the stabilization of alumina slurries.

The use of carbon dioxide is known in the preparation of aluminas. Fricke and Jockers in Z. NATURF. volume 2, page 244 (1947) teach that if amalgamated aluminum is oxidized with boiling water boehmite is formed. When the pH of the water was lowered by bubbling carbon dioxide through the water, gelatinous boehmite was formed at room temperature. However, this process deals with the formation of alumina and not with the stabilization of subsequent slurries made from alumina.

Once formed, aluminas can often be placed into dispersions or suspensions (called slurries in the art) through the use of peptizing agents such as an acid. Examples of such acids are hydrochloric acid and nitric acid. Once in a suspension or slurry state, these aluminas are commercially used in widely varying applications. Representative examples of such applications are frictionizing paper surfaces, fiberglass surfaces and metal surfaces. Alumina is used as anti-static and soil protection on wool, nylon, and acrylic carpets. Alumina is used as a dispersion agent in rug shampoos, anti-static and anti-soil agent, as binder for vacuum-cast alumina silica fibers, as a sintering aid, and for coating ceramic monoliths for auto exhaust catalysts. Usually such aluminas are alpha alumina monohydrates which tend to form more stable collodial aqueous dispersions with dilute peptizing agents such as acids than do the other aluminas such as alpha alumina trihydrates etc. However, all alumina slurries, unless stabilized in some fashion, tend to very rapidly form thick gelatinous materials (or gels) and become unusable for commercial applications. Thus it is of importance to maintain the viscosity lifetime of a prepared slurry at a desired level for as long as possible.

Thus slurries of aluminas and dilute acids, particularly alpha alumina monohydrate, can be used for many purposes. The viscosity and useful lifetime of these slurries are influenced by alumina concentrations, acid concentration, the type of acid employed, and the type of alumina employed.

It would therefore be of great benefit to provide a simple and effective method for increasing the useful life of alumina slurries. The method should be simple, commercially feasible, effective, and provide no by-products to the finished slurry.

It is therefore an object of the instant invention to provide a treatment whereby the useful life of alumina slurries can be extended while maintaining slurry and acid concentrations at constant levels. Other objects will become apparent to those skilled in this art as the description proceeds.

It has now been discovered in accordance with the instant invention that stability of alumina slurries can be greatly extended by heating the alumina in water at temperatures of from about 40° C. to about 100° C., removing the treatment water; recovering the alumina and adding sufficient water and peptizing agent to form the desired finished slurry, then bubbling carbon dioxide through the slurry. It has also been discovered that the treatment water itself can be saturated with carbon dioxide prior to the hot water treatment, thus also increasing the life of the finished alumina slurry.

The alumina should be treated in water at temperatures of from about 40° C. to about 100° C. However, temperatures of from about 50° C. to about 100° C. are preferred and temperatures of from about 75° C. to 100° C. are most preferred. The water can be superheated by placing under pressure to form steam, and thus while temperatures of above 100° C. are possible, they are not preferred because of the excess energy necessary and more sophisticated equipment required.

The alumina to be treated is heated with water at the temperatures described for periods of time ranging from about 5 minutes to about 10 hours. However, times from about 30 minutes to about 5 hours are preferred, and times of from about 1 hour to about 3 hours are most preferred. When $CO_2$ is used in the treatment water, it is preferred to saturate the water with carbon dioxide at treatment temperatures, although any carbon dioxide present will assist in the longevity of the treatment. Alternatively, carbon dioxide can be sparged through the finished slurry in order to increase the slurry life. While no carbon dioxide is necessary in the treatment water, it will be realized that a combination of carbon dioxide-saturated treatment water and carbon dioxide sparging can be used and will provide improved results.

Non-treated alumina slurries tend to increase in pH and viscosity over a period of time. However, the correlation between pH and viscosity cannot be reversed by simply adding acids, since higher acid levels promote gelling of the alumina. The sparging of carbon dioxide into the solution lowers the pH of the alumina, perhaps due to a buffering action, but in this instance the pH in the presence of carbon dioxide does not appear related to the longevity of the slurry.

The concentration of alumina in the treatment water is not critical. Concentrations ranging from about 5 to about 50% solids can be used as desired for convenience. However, treatment of slurries ranging from about 15 to about 45% solids are preferred and finished slurries from 30 to 50% solids are normal. Of the alumina dispersions tested, alpha alumina monohydrate is the preferred alumina for slurries and dispersions.

BRIEF DESCRIPTION OF DRAWING.

In the attached figures.

The invention is more concretely described with reference to the examples below wherein all parts and percentages are by weight unless otherwise specified. The examples are provided to illustrate the instant invention and not to limit it.

Example 1 shows the treatment and subsequent preparation of a 35% alumina slurry. Example 2 shows the treatment and subsequent stabilization of a 40% alumina slurry.

EXAMPLE 1

A steady stream of carbon dioxide was bubbled through 1750 grams of water at 75° C. using a fritted glass tube. At the desired temperature, 250 grams of alpha aluminia monohydrate prepared from the hydrolyzation of aluminum alkoxides were added with stirring. The stirring and carbon dioxide addition were continued while the temperature was maintained between 70° and 80° C. for 2 hours. At the conclusion of 2 hours the solution was allowed to cool and settle for 30 minutes at which time the water was decanted.

The alumina was recovered as a wet cake. Analysis of the wet cake for $Al_2O_3$ content was made. Sufficient water was added to the wet cake to give an equivalent weight of $Al_2O_3$ in the slurry as would be present in a 35 weight percent slurry of the untreated alumina. Nitric acid at 0.66 weight percent was added to the slurry as a peptizing agent. The slurry was stirred at room temperature and the pH and viscosity were measured periodically.

EXAMPLE 2

An identical treatment and slurry preparation was carried out on the same alumina as described in Example 1 except that no $CO_2$ sparge was used.

EXAMPLE 3

A comparative control was carried out on the same alumina as described in Example except that no hot water treatment or $CO_2$ sparge was used.

Comparative data from Examples 1 and 2 is shown in Table 1.

Table I

| Time | pH | Viscosity | Treatment pH | Treatment Viscosity | CO₂ Saturated Treatment pH | CO₂ Saturated Treatment Viscosity |
|---|---|---|---|---|---|---|
| 10 minutes | 4.71 | 17 | 4.76 | 18 | 4.10 | 10 |
| 1 hour | 4.81 | 20 | 4.91 | 18 | 4.31 | 13 |
| 2 hours | 5.00 | 17 | 4.85 | 15 | 4.41 | 10 |
| 4 hours | 5.08 | 15 | 4.87 | 15 | 4.50 | 10 |
| 24 hours | 5.27 | 42 | 5.16 | 17 | 4.87 | 10 |
| 48 hours | 5.5 | 35,000 | 5.22 | 20 | 5.09 | 10 |
| 72 hours |  |  | 5.26 | 180 | 5.15 | 27 |

Figure 1:
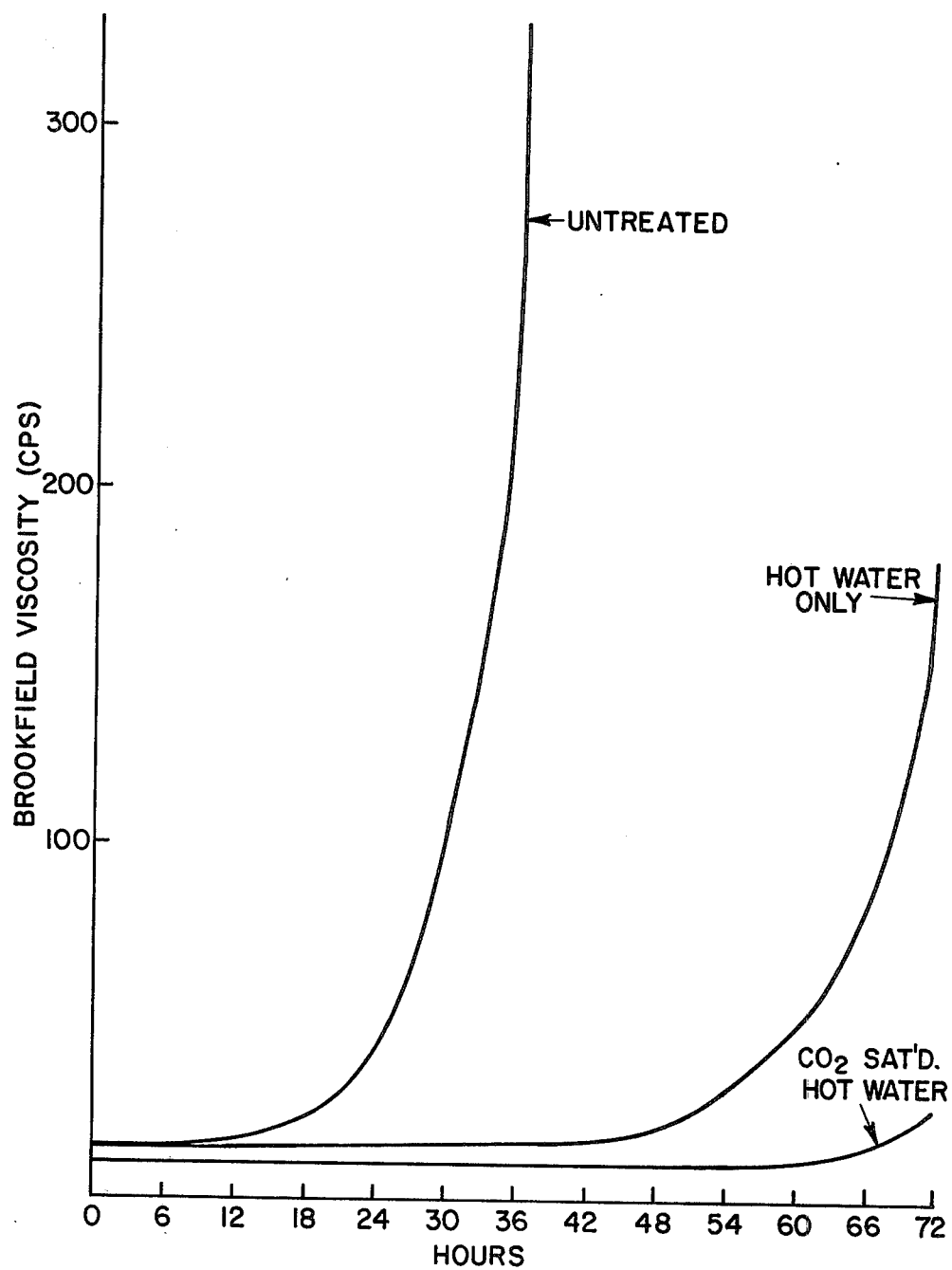
FIG. 1 shows a 35% finished slurry of alpha alumina monohydrate (70 to 75 percent $Al_2O_3$). The stability of the slurry is shown for various periods of time, and a comparison is illustrated between finished untreated slurries, finished slurries made from hot water treated alumina and finished slurries made from carbon dioxide saturated hot water treated alumina. Examination of the figure will clearly show the superiority of the treatment.
Figure 2:
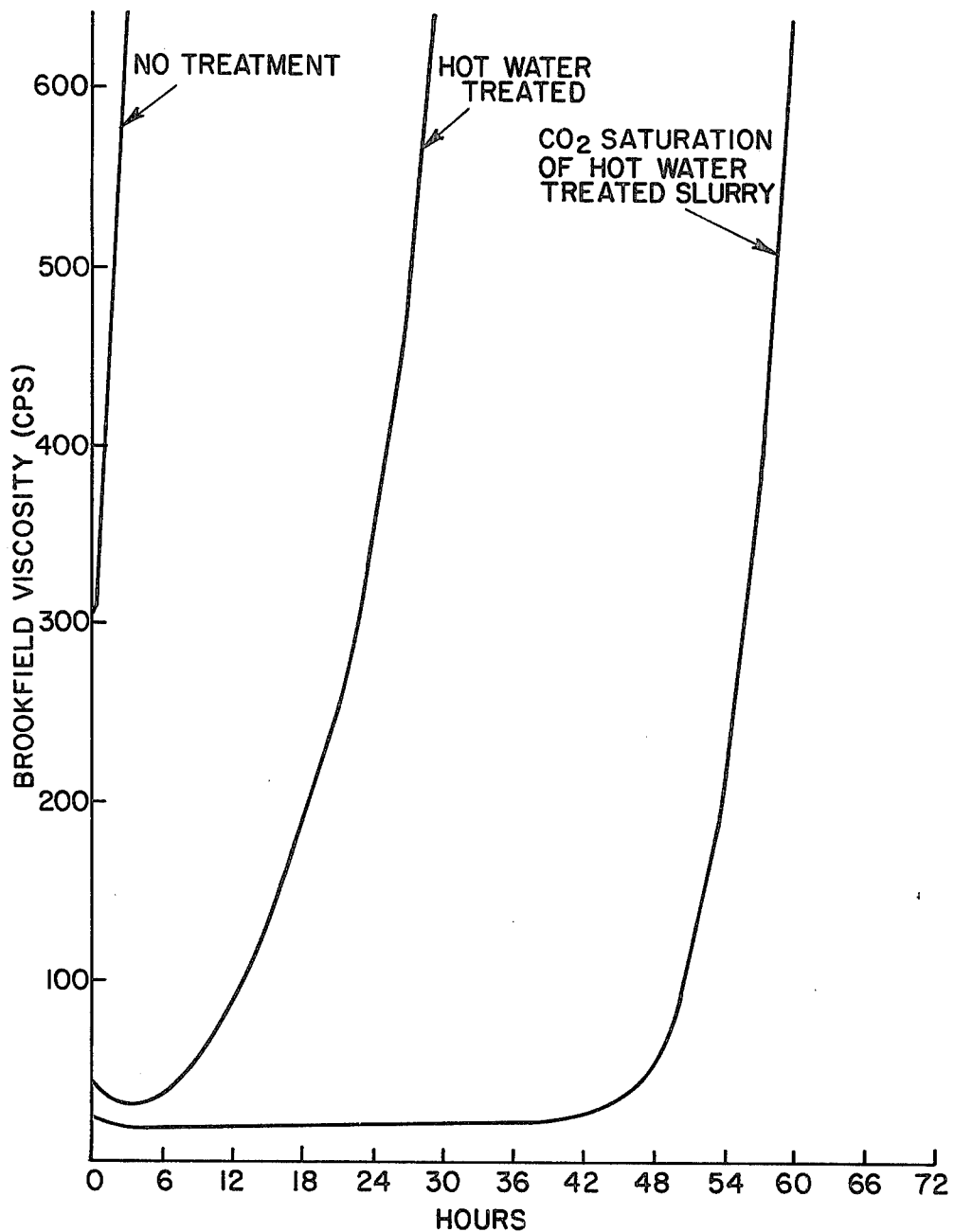
FIG. 2 shows a 40% finished slurry which has not been treated in comparison with a slurried alumina which was first treated with hot water and in which the slurried alumina was first treated with hot water and the finished slurry then saturated with carbon dioxide. The comparison of FIG. 1 and FIG. 2 will show more rapid gelling for FIG. 2 because of the higher solids content of the slurry. This faster gelling with higher solids content is a well-known phenomena, yet the treatment of the instant invention clearly extends the useful life of the alumina to a great extent.

Comparative data from all these examples is shown in FIG. 1 wherein the improvements of the method of the instant invention are graphically illustrated.

EXAMPLE 4

Six kilograms of water were heated to 75° C. and 1 kilogram of alpha alumina monohydrate obtained from the hydrolysis of aluminum alkoxide was added. The slurry was stirred for 2 hours while maintaining the temperature of 75° C. At the end of 2 hours the slurry was allowed to settle and cool for 1 hour. The water was then decanted and the alumina was recovered as a wet cake.

The wet cake recovered was analyzed by water loss for the amount of $Al_2O_3$ present. Sufficient water was returned to the wet cake to give an equivalent weight of $Al_2O_3$ in the slurry as would be present in a 40 weight percent slurry of the untreated alumina. Nitric acid in the amount of 0.76 percent by weight was added as a peptizing agent. The slurry so prepared was divided into two equal portions. In one portion a constant stream of carbon dioxide was bubbled through the slurry from the fritted glass tube. The other slurry received no carbon dioxide treatment. The slurries were stirred at room temperature and the pH and viscosity measured periodically. The results of the two examples are shown in Table 2 below.

Table 2

| Time | No Treatment pH | No Treatment Viscosity | Hot Water Treatment pH | Hot Water Treatment Viscosity | Hot Water Treated and CO₂ Saturated pH | Hot Water Treated and CO₂ Saturated Viscosity |
|---|---|---|---|---|---|---|
| 10 minutes | 4.92 | 312 | 4.74 | 55 | 4.25 | 28 |
| 1 hour | 5.05 | 375 | 4.88 | 38 | 4.16 | 23 |
| 2 hours | 5.13 | 475 | 4.94 | 35 | 4.14 | 23 |
| 4 hours | 5.33 | 35,000 | 5.01 | 35 | 4.14 | 20 |
| 24 hours |  |  | 5.14 | 355 | 4.33 | 23 |
| 48 hours |  |  |  | gel | 4.50 | 38 |
| 72 hours |  |  |  |  |  | gel |

The comparative examples clearly show an increase in alumina slurry life time of about 4 to about 60 hours for a 40% solids content alumina slurry and from about 36 hours to over 72 hours for a 35% solids content alumina slurry.

For many purposes, an alumina slurry can be considered unuseable when the viscosity goes above about 1,000 centipoise (cps) as measured on a Brookfield viscometer. For many other purposes it may be unuseable at 100 cps. Commercial applications normally use a pumpable slurry, which can range from water consistancy to a thick paste.

While certain embodiments and details have been shown for the purpose of illustrating this invention, it will be apparent to those skilled in this art that various changes and modifications may be made herein without departing from the spirit or scope of the invention.

I claim:

1. A method for stabilizing alumina slurries against viscosity increases comprising heating alumina in water at temperature of from about 40° C. to about 100° C. for a time ranging from about 5 minutes to about 10 hours, removing the water and readding water and peptizing agents to the retained alumina to form a slurry then sparging carbon dioxide through the slurry.

2. A method as described in claim 1 wherein the alumina is alpha alumina monohydrate.

3. A method for stabilizing alpha alumina monohydrate slurries against viscosity increases comprising heating said alumina in water at temperatures of from about 50° C. to about 100° C. for a time ranging from about 5 minutes to about 10 hours, wherein the water/alumina slurry is sparged with carbon dioxide during heating to further increase stability, removing the water, then readding water and peptizing agent to form the finished slurry.

* * * * *